United States Patent
Kuwata et al.

(10) Patent No.: US 8,134,526 B2
(45) Date of Patent: Mar. 13, 2012

(54) LIGHT DIFFUSION ELEMENT, SCREEN, AND IMAGE PROJECTOR

(75) Inventors: Muneharu Kuwata, Tokyo (JP); Tomohiro Sasagawa, Tokyo (JP); Jun Someya, Tokyo (JP); Hiroaki Sugiura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1202 days.

(21) Appl. No.: 11/905,136

(22) Filed: Sep. 27, 2007

(65) Prior Publication Data
US 2008/0129896 A1     Jun. 5, 2008

(30) Foreign Application Priority Data
Dec. 4, 2006   (JP) .................................. 2006-327231

(51) Int. Cl.
*G09G 3/36* (2006.01)
(52) U.S. Cl. ............................. 345/87; 345/55; 345/203
(58) Field of Classification Search .................... 345/87, 345/55, 204
See application file for complete search history.

(56) References Cited

U.S. PATENT DOCUMENTS
5,136,409 A * 8/1992 Fushimi et al. ............... 349/143

FOREIGN PATENT DOCUMENTS
| JP | 2001-100316 | A |   | 4/2001  |
|----|-------------|---|---|---------|
| JP | 2005-352020 | A |   | 12/2005 |
| JP | 2006-145973 | A |   | 6/2006  |
| JP | 2006-145973 | A | * | 6/2006  |
| JP | 2006-227161 | A |   | 8/2006  |

* cited by examiner

*Primary Examiner* — Richard Hjerpe
*Assistant Examiner* — Leonid Shapiro
(74) *Attorney, Agent, or Firm* — Birch, Stewart, Kolasch & Birch, LLP

(57) ABSTRACT

A light diffusion element includes a light diffusion layer that contains at least two types of liquid crystal molecules each having a different light scattering characteristic defined by a voltage and a refractive index. A pair of electrodes sandwiches the light diffusion layer, an applying unit generates and applies a variable voltage to the pair of electrodes, and a voltage changing unit varies the voltage generated by the applying unit. The voltage changing unit varies the voltage such that each of the refractive indexes of the liquid crystal molecules in the light diffusion layer changes temporally.

5 Claims, 4 Drawing Sheets

APPLIED VOLTAGE A

APPLIED VOLTAGE B

LIGHT DIFFUSION ELEMENT, SCREEN, AND IMAGE PROJECTOR

BACKGROUND OF THE INVENTION

1. Field of the Invention

The present invention generally relates to a light diffusion element, a screen, and an image projector.

2. Description of the Related Art

With the development of a liquid crystal technology, various image display apparatuses have been recently developed. A rear projector is one of such image display apparatuses that uses liquid crystal. In the rear projector, light emitted by a light source travels to a light modulator after passing through an illumination system. The light modulator modulates the light to form an image made of lights, and the image is displayed on a screen from a rear side by an optical system including a lens or a mirror, thereby the image is displayed on the screen. Such image projector is employed in a large-screen television set for public use and an information display and advertisement display for enterprise use.

A white light source such as a lamp is used, for example, as a light source for the image projector. A white light emitted from the white light source is separated into three primary colors, red (R), green (G), and blue (B) with regard to space and time, and each of the separated lights is modulated based on image signals by a light modulator. The modulated lights are re-combined to form a color image.

An illumination system of the image projector includes a light homogenizer that makes distributed intensity of light emitted from a light source uniform, a light deforming unit that deforms a cross-sectional shape of light flux from circle to square able to fit the light to a light modulator, a separating unit (such as a color filter) that separates a white light emitted from a light source into three primary colors, and an optical element (such as a lens and a mirror) that forms an image from light coming from a light source to display the image on a desired position with a desired size.

A reflection-type light modulator such as a digital micro-mirror device (DMD) (registered trademark) or a transmissive or a reflective liquid crystal panel can be used as a light modulator of the image projector. The light modulator modulates light. For example, in a three-layer method, three light modulators separate the white light into three primary colors, and each of the three light modulators independently modulates a corresponding color. In a single-chip method, one light modulator alternately separates a white light into three primary colors at a different timing by using rotating three-color filter located on a light path, and alternately modulates each of the three color lights at a different timing.

A screen of the image projector transmits an image (i.e., lights) coming from the rear face and displays the image on the front face for viewers. The screen includes a Fresnel lens that deflects the spreading light toward viewers and a lenticular lens that widen a viewing angle mainly in a horizontal direction. If a light diffusion layer is mounted on one or both of the Fresnel lens and the lenticular lens, it is possible to widen a viewing angle in a vertical direction by diffusing the light by the light diffusion layer.

In the conventional screen, it is impossible to display a clear image due to speckles (glares on an image that are called scintillation) because scattered light caused by a diffusion layer in the screen interferes with one another.

Recently, to display more vivid images, some image projectors use a laser that emits lights with wavelength bands corresponding to R, G, and B as a light source. However, when such a laser is used, speckles appear more remarkably because lights emitted from the laser are highly coherent. To obtain a clear image while using the laser, it is important to reduce speckles.

To solve the problem, Japanese Patent Application Laid-open No. 2001-100316 discloses a technology for reducing speckles by changing in terms of time at least one of a scattering distribution and a phase of waves in a light diffusion layer. Japanese Patent Application Laid-open No. 2005-352020 disclose another technology for reducing speckles by periodically applying voltage to at least two liquid crystal layers to obtain an effect of vibrating scattering surfaces of the liquid crystal layers.

However, in the former technology, the scattering distribution by the light diffusion layer is changed in terms of time so that a transmission rate (brightness of a display image) on a screen also changes depending on the light scattering character of the light diffusion layer. If this technology is applied to a single-chip projector, it is necessary to synchronize a timing of displaying R, G, and B images with a timing of changing the scattering characteristic of the light diffusion layer, thus causing controlling of the scattering characteristic of the light diffusion layer to be complicated. Unless synchronizing, a color balance of an obtained image is lost. Moreover, according to the latter technology, a plurality of liquid crystal layers causes a complicated structure of a light diffusion element and an increase of manufacturing costs.

SUMMARY OF THE INVENTION

It is an object of the present invention to at least partially solve the problems in the conventional technology.

According to an aspect of the present invention, a light diffusion element includes a light diffusion layer that contains at least two types of liquid crystal molecules each having a different light scattering characteristic defined by a voltage and a refractive index, the liquid crystal molecules selectively diffusing a light passing through the light diffusion layer depending on a voltage applied to the light diffusion layer; a pair of electrodes that sandwiches the light diffusion-layer and configured to apply a voltage to the light diffusion layer; an applying unit configured to generate and apply a variable voltage to the pair of electrodes; and a voltage changing unit that varies the voltage generated by the applying unit whereby each of the refractive indexes of the liquid crystal molecules in the light diffusion layer changes temporally.

According to another aspect of the present invention, a screen displays an image by projecting a light includes the above light diffusion element.

According to still another aspect of the present invention, an image projector includes a light source that emits a light; a light focusing unit that makes the light coming from the light source to be a substantially parallel light flux, and focuses the substantially parallel light flux to a target surface located on an axis of the substantially parallel light flux; an image projection unit that modulates and spreads the substantially parallel light flux focused on the target surface, and projects modulated and spread light; and the above screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
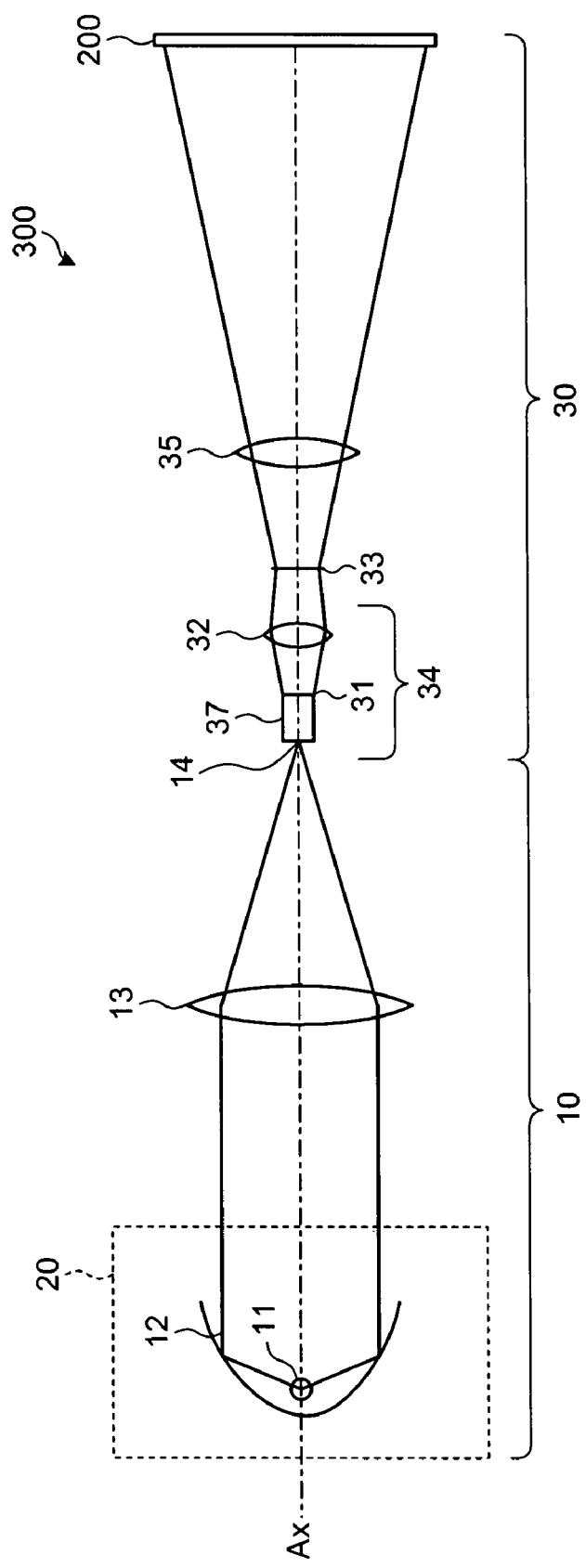
FIG. 1 is a side view of an image projector according to a first embodiment of the present invention.

FIG. 1 is a side view of an image projector 300 according to a first embodiment of the present invention. The image projector 300 includes a light source device 10 and an image projection mechanism 30. The light source device 10 includes a main light source 20, a condenser lens 13, and a light-focus surface 14.

The main light source 20 includes a light source 11 that uses an extra high pressure mercury lamp and a paraboloid reflector 12. In the main light source 20, light emitted from the light source 11 is reflected by the paraboloid reflector 12 to obtain a substantially parallel light flux. Then, the parallel light is emitted to the condenser lens 13. For convenience of explanation, in the image projector 300, an axis of the parallel light emitted from the paraboloid reflector 12 is assumed to be a light axis Ax.

The image projection mechanism 30 includes a light homogenizer 37 that makes light emitted from the light source device 10 uniform, a relay optical system 32 that conveys the light exited from an exit surface 31 of the light homogenizer 37, a light modulator 33 that modulates the light coming from the relay optical system 32, a projection optical system 35 that enlarges and projects the light coming from the light modulator 33 on an image display screen 200, and the image display screen 200.

The light homogenizer 37 and the relay optical system 32 form an illumination system 34 for conveying the light coming from the light source device 10 to the light modulator 33. The light homogenizer 37 is made from a light pipe with a reflection film covering over an inner peripheral surface of the light pipe. The cross-sectional shape of the light pipe is square similar to a display area of the light modulator 33. The light pipe has two ends, one is an entrance surface from which light enters, and the other is the exit surface 31 from which the light exits. The light entered from the entrance surface passes through the light pipe to the exit surface 31 while being totally reflected by the reflection film. When exiting from the exit surface 31, the intensity distribution of the light becomes uniform.

The relay optical system 32 is located between the light homogenizer 37 and the light modulator 33. The relay optical system 32 has a function of forming an image from the light passed through the light homogenizer 37 such that the exit surface 31 of the light homogenizer 37 and the light modulator 33 have a cooperative relation.

The light modulator 33 includes, for example, a reflective digital micro-mirror device (DMD), a transmissive liquid crystal panel, or a reflective liquid crystal panel. The light modulator 33 can be formed as either a single chip that is made of one light modulator, or a multiple chip that is made up of a plurality of light modulators (such as a three chip that is made up of three light modulators).

The projection optical system 35 that is located between the light modulator 33 and the image display screen 200 has a function of forming an image from the light passed through the light modulator 33 such that the light modulator 33 and the image display screen 200 have a cooperative relation.

If the image projector 300 is a rear projector, thereby the image display screen 200 is a transmission screen. The image display screen 200 that is a transmission screen includes a Fresnel lens (corresponding to a Fresnel lens 8 described later) located on a first side closer to the projection optical system 35 and a lenticular lens (corresponding to a lenticular lens 9 described later) located on a second side closer to viewers. An image is displayed on the second side. The Fresnel lens has a function of causing the light coming from the projection optical system 35 and passing through the Fresnel lens to be a substantially parallel light. The lenticular lens has a function of widening a viewing angle of the substantially parallel light coming from the Fresnel lens by a group of cylindrical lenses arranged in parallel, and projecting the light with a wide-range angle on the second side of the image display screen 200 as an image.

If the image projector 300 is a front projector, thereby the image display screen 200 is a reflection screen. The image display screen 200 that is a reflection screen has a substantially complete diffusion surface. Light coming from the projection optical system 35, after a viewing angle of the light is widened, is reflected on the first side of the image display screen 200 as an image.

Light emitting from the light source 11 is made into a substantially parallel light flux by the paraboloid reflector 12. The substantially parallel light flux is focused on the light-focus surface 14 arranged on the light axis Ax by the condenser lens 13. Light focused on the light-focus surface 14 of the light source device 10 enters the light homogenizer 37 from the entrance surface that is located on the light-focus surface 14, passes through inside of the light homogenizer 37 while repeatedly reflected thereby being uniform, and exits from the exit surface 31. The light exit from the exit surface 31. Light exited from the exit surface 31 is refracted, or reflected by the relay optical system 32, and goes to the light modulator 33. The light modulator 33 modulates the light coming from the relay optical system 32 based on input image signals. The modulated light is enlarged through refraction and reflection by the projection optical system 35, and the enlarged light is projected on the image display screen 200 as an image.

The light homogenizer 37 can be a transparent rod integrator that has a squarer cross-sectional shape similar to the display area of the light modulator 33. The rod integrator conveys light entered from the entrance surface to the exit surface 31 while completely reflecting the light by a side face (an interface adjacent to an air layer), thereby causing the light exited from the exit surface 31 to have a uniform intensity distribution.

It is allowable to arrange a color wheel for displaying a color image, a dichroic filter for transmitting or reflecting only light with a predetermined wavelength band, and a prism for combining lights with different wavelength bands on any position either prior to the light-focus surface 14 (a side closer to the light source device 10) or subsequent to the exit surface 31 (a side closer to the image display screen 200), that is, outside of the light homogenizer 37.

In the above explanation, it is assumed that an extra high pressure mercury lamp is used as the light source 11 of the main light source 20. However, it is acceptable to use another lamp such as a xenon lamp, a metal halide lamp, an electrodeless discharge lamp. Although the main light source 20 includes the paraboloid reflector 12, another reflector such as an ellipsoidal reflector can be used instead of the paraboloid reflector 12. If the main light source 20 includes an ellipsoidal reflector, the light source device 10 does not need the condenser lens 13. Light emitted from the light source 11 is directly focused on the light-focus surface 14.

Figure 2:
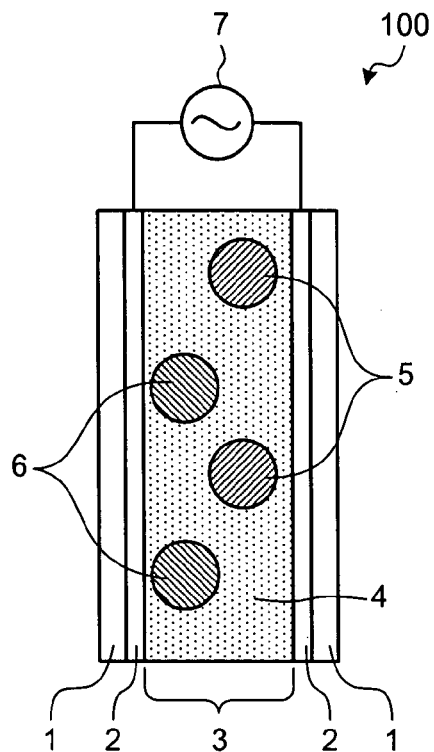
FIG. 2 is a side view of a light diffusion element according to the first embodiment.

A configuration of a light diffusion element 100 used in the image display screen 200 is explained below. FIG. 2 is a side view of the light diffusion element 100 according to the first embodiment. The light diffusion element 100 that diffuses and transmits light coming from the light source device 10 includes a pair of transparent substrates 1, a pair of transparent electrodes 2, a liquid crystal layer (light diffusion layer) 3, and a power supply circuit 7.

The pair of transparent substrates 1 sandwich the liquid crystal layer 3 placed between the pair of transparent electrodes 2. In other words, one of the transparent electrodes 2 is arranged on one transparent substrate 1, and the liquid crystal layer 3 is arranged on the transparent electrode 2. Subsequently, the other one of the transparent electrodes 2 is arranged on the liquid crystal layer 3, and the other one of the transparent substrates 1 is arranged on the transparent electrode 2. The power supply circuit 7 is connected to each of the transparent electrodes 2.

The liquid crystal layer 3 includes a polymer material (a polymer layer) 4, a first liquid crystal molecule 5, and a second liquid crystal molecule 6. A predetermined voltage is applied from the power supply circuit 7 through the transparent electrodes 2 to the liquid crystal layer 3. The power supply circuit 7 applies voltage to the transparent electrodes 2 based on driving signals sent from a control device (not shown).

Materials for the transparent substrates 1 includes for example, glass, plastic, and a poly ethylene terephtalate (PET) film. Materials for the transparent electrode 2 include, for example, $In_2O_3$, indium tin oxide (ITO), and $SnO_2$. The liquid crystal layer 3 is made of a polymer media including, for example, a small amount of nematic liquid crystal substantially uniformly diffused. Materials for the liquid crystal molecules 5 and 6 include, for example, 4'-pentyl-4-cyanobiphenyl and 5-cyanobiphenyl.

When voltage is applied to such a liquid crystal layer made of a polymer material including a liquid crystal molecule, an orientation of the liquid crystal molecule changes according to the applied voltage. Consequently, a refractive index of the liquid crystal molecule changes according to the applied voltage. When a refractive index of the polymer material is equal to that of the liquid crystal molecule, light entered the liquid crystal layer straightly travels without being scattered. However, when the refractive index of the polymer material is not equal to that of liquid crystal molecule, light entered the liquid crystal layer is scattered by the liquid crystal molecule. Therefore, it is possible to control a light scattering characteristic of the liquid crystal layer by applying voltage to the liquid crystal layer.

Each of the first liquid crystal molecule 5 and the second liquid crystal molecule 6 have a different light scattering characteristic that is defined by a voltage and a refractive index.

Figure 3:
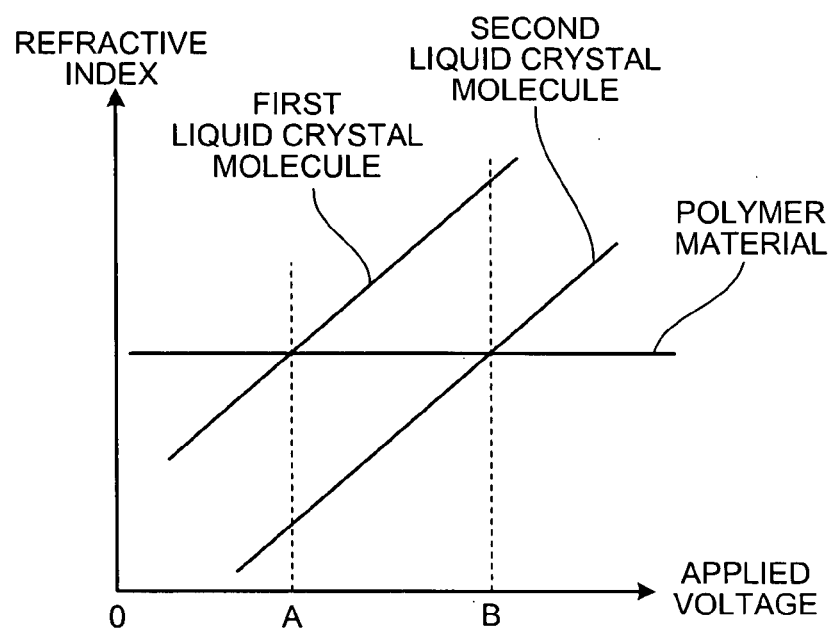
FIG. 3 is a graph for explaining a relation between an applied voltage and a refractive index in a liquid crystal layer shown in FIG. 2.

FIG. 3 is a graph for explaining a light scattering characteristic, that is, a relation between an applied voltage and refractive indexes of the first liquid crystal molecule 5, the second liquid crystal molecule 6, and the polymer material 4 in the liquid crystal layer 3. The refractive indexes of the first liquid crystal molecule 5 and the second liquid crystal molecule 6 vary according to an applied voltage, and are different to each other when the same voltage is applied. In other words, each of the first liquid crystal molecule 5 and the second liquid crystal molecule 6 has a different light scattering characteristic.

The polymer material 4 has a constant refractive index independent from change of voltage. As shown in FIG. 3, a refractive index of the first liquid crystal molecule 5 is equal to that of polymer material 4 when a voltage A (first voltage level) is applied, and a refractive index of the second liquid crystal molecule 6 is equal to that of polymer material 4 when a voltage B (second voltage level) is applied.

Figure 4:
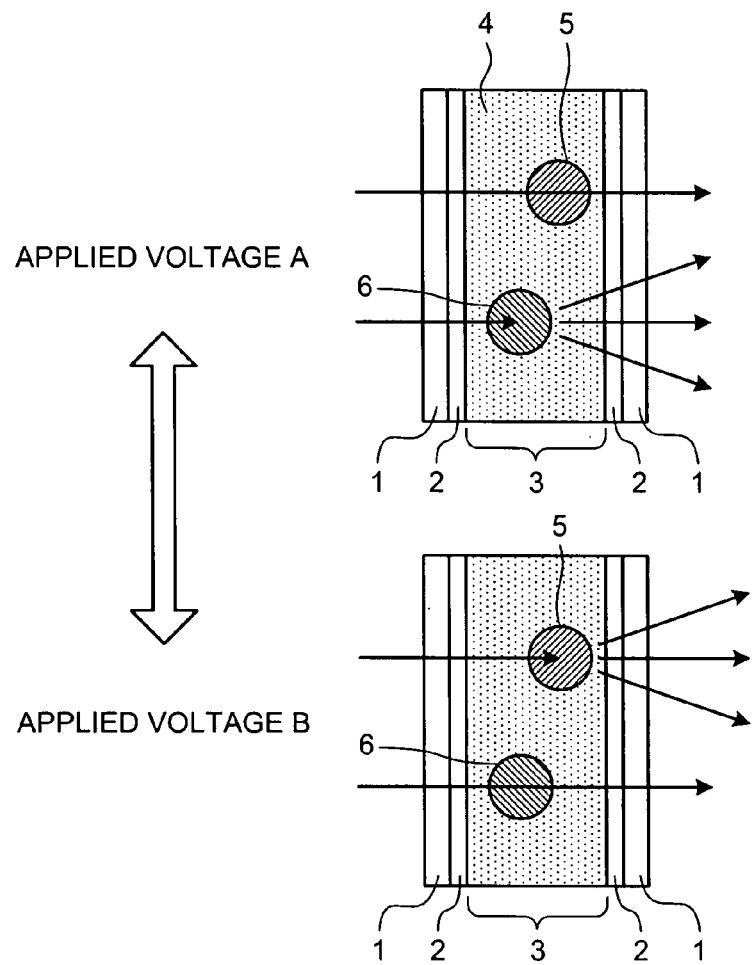
FIG. 4 is a schematic diagram for explaining light diffusion that varies depending on the applied voltage.

Change in the light scattering in liquid crystal layer 3 depending on the applied voltage is explained below. FIG. 4 is a schematic diagram for explaining the light scattering of the liquid crystal layer 3 having the light scattering characteristics shown in FIG. 3 that are variable depending on the voltage. The voltage that is applied to the liquid crystal layer 3 varies to the voltage A or B.

When the voltage A is applied to the liquid crystal layer 3, because the refractive index of the first liquid crystal molecule 5 is equal to that of the polymer material 4, light passing through the first liquid crystal molecule travels straight without being scattered. Because the refractive index of the second liquid crystal molecule 6 is different from that of polymer material 4, light passing through the second liquid crystal molecule 6 is scattered. Accordingly, when the voltage A is applied to the liquid crystal layer 3, speckles due to interference of the light scattered by the second liquid crystal molecule 6 (hereinafter, "second speckle pattern") are formed.

When the voltage B is applied to the liquid crystal layer 3, because the refractive index of the first liquid crystal molecule 5 is different from that of the polymer material 4, light passing through the first liquid crystal molecule 5 is scattered. Because the refractive index of the second liquid crystal molecule 6 is equal to that of polymer material 4, light passing through the second liquid crystal molecule 6 travels straight without being scattered. Accordingly, when the voltage B is applied to the liquid crystal layer 3, speckles due to interference of the light scattered by the first liquid crystal molecule 5 (hereinafter, "first speckle pattern") are formed.

The speckles mean glares on an image that is called as scintillation, in other words, uneven angle distribution due to interference of light on a screen. When lights passes through the screen via various light paths, interference between lights passing through the same position of the screen at the same orientation causes the lights to intensify or weaken. This phenomenon is called as scintillation.

When the voltage that periodically is switched to either the voltage A or B is applied to the liquid crystal layer 3 having the light scattering characteristic described above, the light scattering characteristic (more particularly, the refractive index of the first liquid crystal molecule 5 and the second liquid crystal molecule 6) changes in terms of time, whereby periodically appearing the first speckle pattern and the second speckle pattern in turn. More particularly, if the voltage applied to the liquid crystal layer 3 is periodically switched to either the voltage A or B at such a predetermined timing that causes applying period of the voltage A equal to that of the voltage B, a transmission rate of the liquid crystal layer 3 per time is averaged. As a result, the liquid crystal layer 3 obtains a substantially constant transmission rate (equal to the transmission rate of the polymer material 4). This makes it possible to average a period when the first speckle pattern appears and a period when the second speckle pattern appears, thus reducing speckles in appearance.

Figure 5:
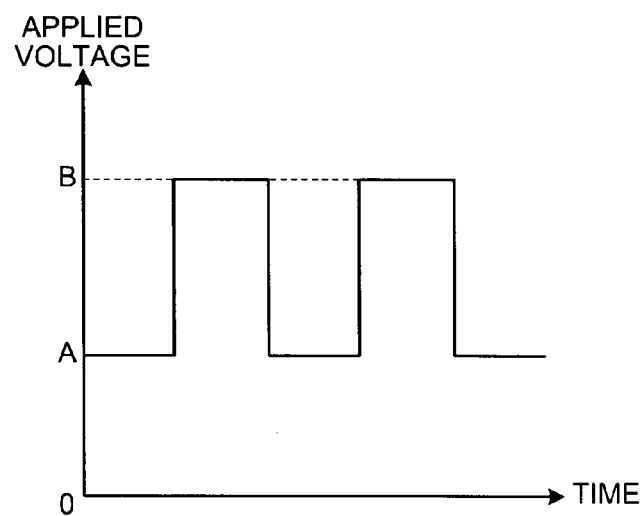
FIG. 5 is a graph for explaining a pattern of voltage applied to the liquid crystal layer shown in FIG. 2.

For example, by using a voltage pattern (driving signals) shown in FIG. 5, the voltage applied to the liquid crystal layer 3 is varied. Such a period for switching to either the first speckle pattern or the second speckle pattern is applied that a viewer cannot recognize the switching. It is preferable to set the period for switching to either the first speckle pattern or the second speckle pattern, for example, to 30 hertz or more, more preferably to 50 hertz or more.

To make the difference clear between a conventional light diffusion element (more particularly, liquid crystal layer) and the light diffusion element 100 (more particularly, the liquid crystal layer 3) according to the first embodiment, a light scattering character (diffusion effect) of the conventional liquid crystal layer including only one type of liquid crystal molecule (for example, the first liquid crystal molecule) is explained with regard to temporal change of voltage applied to the liquid crystal layer.

The voltage periodically switched to either the voltage A or B is applied to the conventional liquid crystal layer in the same manner as the voltage applied to the liquid crystal layer 3. When the voltage B is applied to the conventional liquid crystal layer, light is scattered by the first liquid crystal molecule 5 in the conventional liquid crystal layer. When the voltage A is applied, light is not scattered but transmits through the conventional liquid crystal layer. That is, a transmission rate of the light diffusion element while receiving the voltage A is different from a transmission rate while receiving the voltage B. Therefore, if the conventional light diffusion element is used for displaying an image generated by a single-chip image projector, where each of three color images (red, green, and blue) are generated at a different timing, brightness balance of the three color images is lost. As a result, it is impossible to display an image with intended colors that is carried on image signals.

If the image signals are processed based on the light scattering character of the conventional light diffusion element, the obtained image can have intended colors. However, such signal processing requires synchronizing timing of displaying an image with timing of driving the light diffusion element, thereby causing complicated control in displaying an image with desired colors.

To address this problem, in the light diffusion element 100 according to the first embodiment, the liquid crystal molecules (the first liquid crystal molecule 5 and the second liquid crystal molecule) are selected so that the light diffusion effect of the second liquid crystal molecule 6 while receiving the voltage A is substantially equal to the light diffusion effect of the first liquid crystal molecule 5 while receiving the voltage B. As a result, a transmission rate of the light diffusion element 100 keeps constant all the time while either the voltage A or B is applied to the liquid crystal layer 3 (that is, during displaying an image).

Thus, it is possible to easily display an image with intended colors without performing particular processing (such as signal processing) for image signals. In addition, it is possible to easily display an image with intended colors without synchronizing timing of displaying an image with timing of driving the light diffusion element 100.

In the present embodiment, two types of liquid crystal molecules are included in the liquid crystal layer 3; however, three types or more of liquid crystal molecules each having a different scattering characteristic can be included in the liquid crystal layer 3. For example, n types of liquid crystal molecules are included in the liquid crystal layer 3, and the voltage is prepared to be variable from a first to an n-th levels (n is a natural number). A refractive index of each of the liquid crystal molecules is equal to the refractive index of the polymer material 4 when each of the liquid crystal molecules receives a correspondent one of the voltage levels. Then, the voltage is periodically switched to any one of the voltage levels at a predetermined timing so that a transmission rate of the liquid crystal layer 3 keep substantially constant (equal to a transmission rate of the polymer material 4). This makes it possible to obtain a similar effect to the case in which the liquid crystal layer 3 includes two types of liquid crystal molecules.

Moreover, the voltage is varied to either an upper-limit level (the voltage B) or a lower-limit level (the voltage A). A refractive index of either one of the liquid crystal molecules (the first liquid crystal molecule 5 or the second liquid crystal molecule 6) is equal to that of the polymer material 4 while the voltage of the upper-limit level or the lower-limit level is being applied. It is allowable that both of the liquid crystal molecules scatter light while the voltage of the upper-limit level or the lower-limit level is being applied. With such a configuration, a similar effect can be achieved as compared to the case in which the upper-limit and the lower-limit levels of the voltage are set so that a refractive index of either one of the liquid crystal molecules is equal to that of the polymer material 4.

Furthermore, a driving signal of the voltage applied to the liquid crystal layer 3 has a square waveform. However, it is allowable to have another waveform such as a sine waveform or a triangular waveform. If the sine-wave or triangular-wave voltage signal is applied to the liquid crystal layer 3, the similar effect is achieved as the square-wave voltage signal is applied.

Moreover, an explanation is given about the case of using the light source 11 in the main light source 20 of the light source device 10. The main light source 20 of the light source device 10 is not limited to a light source. For example, a light emitting diode (LED) or a laser light can be used as the main light source 20 of the light source device 10.

Although it is explained that the image projector 300 includes only the main light source 20, it can also include a sub light source that emits an irradiation light within the wavelength area of red light. When the image projector 300 includes a sub light source, light of the main light source 20 and light of the sub light source are combined before emitting to the condenser lens 13.

As described above, the liquid crystal layer 3 includes at least two types of liquid crystal molecules that have a different scattering characteristic respectively and voltage applied to the liquid crystal layer 3 is periodically switched. This makes it possible to reduce speckles (a first speckle pattern and a second speckle pattern) and display a clear image.

Moreover, speckles are more apparent in coherent light. Therefore, when a laser light is used as a light source of the image projector 300, it is possible to effectively reduce speckles in the light diffusion element 100. Hence, it is possible to obtain the light diffusion element 100, the image display screen 200, and the image projector 300 in which speckles can be easily reduced with a simple configuration. This makes it possible to easily display a clearer image based on a simple configuration without changing brightness and color even when using a coherent light source such as a laser light.

An image display screen 210 according to a second embodiment of the present invention is explained below with reference to FIG. 6. In the image display screen 210, a plurality of diffusion layers is arranged apart from one another by a predetermined distance.

Figure 6:
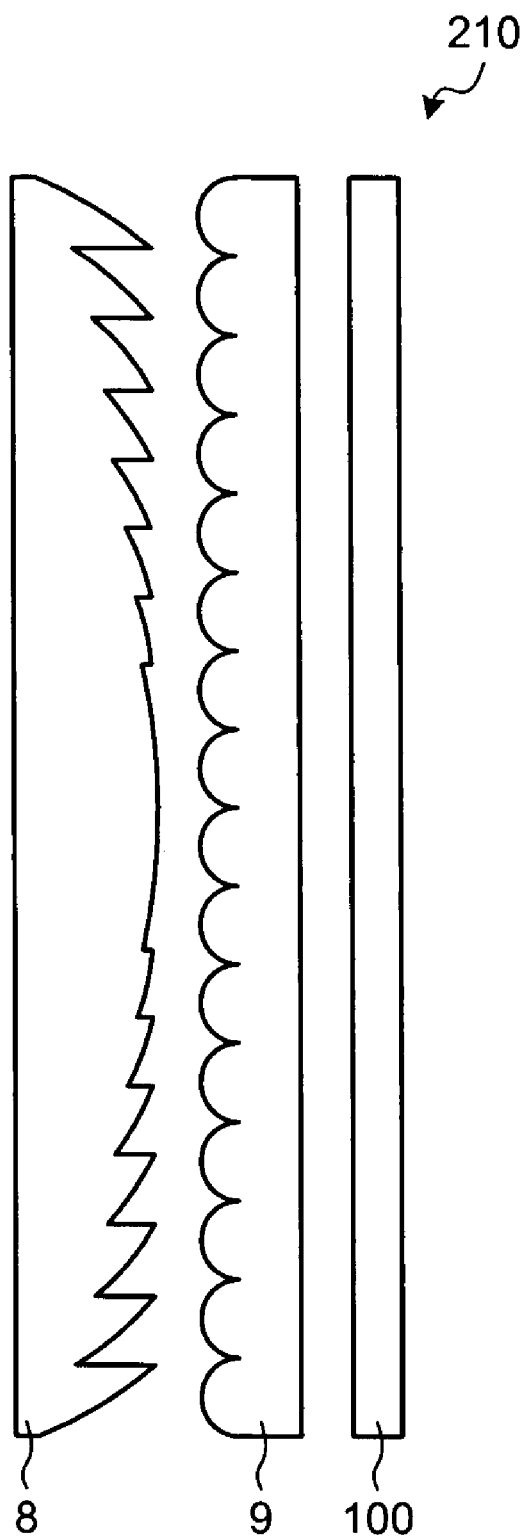
FIG. 6 is a side view of an image display screen according to a second embodiment of the present invention.

FIG. 6 is a side view of the image display screen 210. The image display screen includes the Fresnel lens 8, the lenticular lens 9, and the light diffusion element 100.

The Fresnel lens 8 is arranged on a first side that is closer to the image projector 300 (a projection optical system), and has a function of refracting and transmitting a spreading light coming from the image projector as an image (hereinafter, "image light") to focus the image light able to be fit within a predetermined angle range.

The lenticular lens 9 is arranged between the Fresnel lens 8 and the light diffusion element 100. The lenticular lens 9 has a function of refracting and transmitting the image light passed through the Fresnel lens 8 to spread the image light able to be fit within an adequate angle range where a desired viewing angle is secured.

The light diffusion element 100 is explained in the first embodiment with reference to FIG. 2. The light diffusion element 100 is arranged on a second side that is close to viewers. The light diffusion element 100 has a function of diffusing the image light passed through the lenticular lens 9 and averaging a speckle pattern over time that occurs due to interference of diffused scattered light to reduce speckles on a display image.

As thickness (width) of the light diffusion element 100 (i.e., a length in a direction vertical to its main surface) increases, the light scattering characteristic also increase, whereby increasing speckle reducing effect. However, as the thickness increases, because a distance between the transparent electrodes 2 (transparent electrodes 2 shown in FIG. 2) becomes larger, the light diffusion element 100 requires higher voltage to drive. To drive the light diffusion element 100 with a lower voltage, it is preferable that the light diffusion element 100 is formed to be thinner.

The image displaying screen that includes a plurality of diffusion layers (scattering layers) those arranged apart from one another by a predetermined distance obtains a larger speckle reducing effect, because the diffusion layers diffuse laser light one after another.

To obtain a larger speckle reducing effect while the thickness of the light diffusion element 100 is reduced, for example, a diffusion layer in addition to the light diffusion element 100 is arranged apart from the light diffusion element 100 by a predetermined distance, for example, by including a diffusing agent in either one or both of the Fresnel lens 8 and the lenticular lens 9. Another diffusion layer such as a diffusing sheet can be added to any position in the image display screen 210 as another component.

Moreover, to obtain a constant speckle reducing effect in the image display screen 210, diffusion layers having a higher diffusion effect are arranged closely to one another, on the other hand, diffusion layers having a lower diffusion effect are arranged far away from one another. That is, the diffusion layers is arranged in the image display screen 210 based on the diffusion effect.

The closer to an imaging surface the diffusion layer is located, the lower the speckle reducing effect becomes, and vice versa. The speckle reducing effect is inverse proportion to clearness of images. When a large speckle reducing effect is obtained by increasing the diffusion effect, obtained images are likely to be blurred. Therefore, positions, the number, and diffusion effects of the diffusion layers are determined based on a balance between the speckle reducing effect and the clearness of images.

If the light is coherent, remarkable speckles appear. When a laser light is used as a light source in the image projector, a remarkable speckle reducing effect obtains by using the image display screens 200 or 210.

An explanation is given about the case of arranging the light diffusion element 100 on the second side that is closer to viewers. The light diffusion element 100 can be located another position such as a position between the image projector and the Fresnel lens 8, or a position between the Fresnel lens 8 and the lenticular lens 9. In this case, it is also possible to obtain the same effect as the case of arranging the light diffusion element 100 on the second side.

According to the second embodiment, because the plurality of diffusion layers are arranged apart from one another by a predetermine distance in the image display screen 210, it is possible to reduce speckles in an image light coming from the image projector, and display a clear image even when a light source that emits a coherent light such as a laser is used. Therefore, it is possible to provide the image display screen that can display a clear image by reducing speckles with a simple configuration.

According to an embodiment of the present invention, a light scattering characteristic of a light diffusion layer varies in terms of time, thus reducing speckles with a simple configuration.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light diffusion element comprising:
    a light diffusion layer that diffuses incident light;
    a pair of electrodes that sandwiches the light diffusion layer and configured to apply a voltage to the light diffusion layer;
    a voltage applying unit configured to apply a predetermined voltage to the pair of electrodes, wherein
    the light diffusion layer contains at least two types of liquid crystal molecules each having a different light scattering characteristic defined by the applied voltage, and includes a polymer layer having a light scattering characteristic independent of changes in a change of the applied voltage,
    liquid crystal molecules are distributed in the polymer layer,
    there are "n" types of liquid crystal molecules in a case that n is a natural number being two or more,
    for "i" as a natural number being 1 to n, a refractive index of the i-th liquid crystal molecule is equal to a refractive index of the polymer layer in a case that the voltage applying unit applies i-th voltage to the pair of electrodes,
    in a case that first voltage to n-th voltage are applied to the pair of electrodes, each strength of light scattering in (n minus 1) types of liquid crystal molecules excluding the i-th liquid crystal molecule when i-th voltage is applied, becomes substantially same value, and
    the voltage applying unit applies the first voltage to n-th voltage periodically, whereby an average light transmission rate of the light diffusion layer calculated for any predetermined period, becomes substantially constant.

2. The light diffusion element according to claim 1, wherein a high coherent light is transmitted through.

3. The light diffusion element according to claim 1, wherein a laser light is transmitted through.

4. A screen that displays an image by projecting a light, the screen comprising:
    a light diffusion element that includes
        a light diffusion layer that diffuses incident light;
        a pair of electrodes that sandwiches the light diffusion layer and configured to apply a voltage to the light diffusion layer; and
        a voltage applying unit configured to apply predetermined voltage to the pair of electrodes, wherein the light diffusion layer contains at least two types of liquid crystal molecules each having a different light scattering characteristic defined by the applied voltage, and includes a polymer layer having a light scattering characteristic independent of changes in a change of the applied voltage, liquid crystal molecules are distributed in the polymer layer, there are "n" types of liquid crystal molecules in a case that n is a natural number being two or more, for "i" as natural number being 1 to n, a refractive index of the i-th liquid crystal molecule is equal to a refractive index of the polymer layer in a case that the voltage applying unit applies i-th voltage to the pair of electrodes, in a case that first voltage to n-th voltage are applied to the pair of electrodes, each strength of light scattering in (n minus 1) types of liquid crystal molecules excluding the i-th liquid crystal molecule when i-th voltage is applied, becomes substantially same value, and the voltage applying unit applies the first voltage to n-th voltage periodically, whereby an average light transmission rate of the light diffusion layer calculated for any predetermined period, becomes substantially constant.

5. An image projector comprising:

a light source that emits a light;

a light focusing unit that makes the light coming from the light source to be a substantially parallel light flux, and focuses the substantially parallel light flux on a target surface located on an axis of the substantially parallel light flux;

an image projection unit that modulates and spreads the substantially parallel light flux focused on the target surface, and projects modulated and spread light; and a screen that displays an image based on the light coming from the image projection unit, the screen including a light diffusion element that includes
- a light diffusion layer that diffuses incident light;
- a pair of electrodes that sandwiches the light diffusion layer and configured to apply a voltage to the light diffusion layer; and
- a voltage applying unit configured to apply predetermined voltage to the pair of electrodes, wherein the light diffusion layer contains at least two types of liquid crystal molecules each having a different light scattering characteristic defined by the applied voltage, and includes a polymer layer having a light scattering characteristic independent of changes in a change of the applied voltage, liquid crystal molecules are distributed in the polymer layer, there are "n" types of liquid crystal molecules in a case that n is a natural number being two or more, for "i" as natural number being 1 to n, a refractive index of the i-th liquid crystal molecule is equal to a refractive index of the polymer layer in a case that the voltage applying unit applies i-th voltage to the pair of electrodes, in a case that first voltage to nth voltage are applied to the pair of electrodes, each strength of light scattering in (n minus 1) types of liquid crystal molecules excluding the i-th liquid crystal molecule when i-th voltage is applied, becomes substantially same value, and the voltage applying unit applies the first voltage to n-th voltage periodically, whereby an average light transmission rate of the light diffusion layer calculated for any predetermined period, becomes substantially constant.

* * * * *